(12) United States Patent
Seymour

(10) Patent No.: US 10,239,720 B2
(45) Date of Patent: Mar. 26, 2019

(54) WEB WINDING DEVICE

(71) Applicant: Kimberly-Clark Worldwide, Inc., Neenah, WI (US)

(72) Inventor: Robert James Seymour, Appleton, WI (US)

(73) Assignee: KIMBERLY-CLARK WORLDWIDE, INC., Neenah, WI (US)

( * ) Notice: Subject to any disclaimer, the term of this patent is extended or adjusted under 35 U.S.C. 154(b) by 0 days.

(21) Appl. No.: 15/759,459

(22) PCT Filed: Aug. 28, 2017

(86) PCT No.: PCT/US2017/048956
§ 371 (c)(1),
(2) Date: Mar. 12, 2018

(87) PCT Pub. No.: WO2018/044814
PCT Pub. Date: Mar. 8, 2018

(65) Prior Publication Data
US 2018/0179007 A1    Jun. 28, 2018

Related U.S. Application Data

(60) Provisional application No. 62/381,776, filed on Aug. 31, 2016.

(51) Int. Cl.
*B65H 18/02* (2006.01)
*B65H 23/198* (2006.01)
(Continued)

(52) U.S. Cl.
CPC .......... *B65H 18/02* (2013.01); *B29C 59/046* (2013.01); *B65H 18/025* (2013.01); *B65H 18/10* (2013.01);
(Continued)

(58) Field of Classification Search
CPC ........ B65H 18/02; B65H 18/22; B65H 18/26; B65H 18/145; B65H 23/198; B29C 59/046
See application file for complete search history.

(56) References Cited

U.S. PATENT DOCUMENTS 1,719,830 A   7/1929  Cameron
3,045,940 A   7/1962  Aulen
(Continued)

FOREIGN PATENT DOCUMENTS

CN    202729404 U    2/2013
GB    2100768 A    1/1983

*Primary Examiner* — Sang K Kim
(74) *Attorney, Agent, or Firm* — Kimberly-Clark Worldwide, Inc.

(57) ABSTRACT

The present invention provides an improved belted reel which is particularly well suited for the winding of soft, bulky tissue webs and overcomes the limitations of the prior art. The belted reel is capable of providing coordinated web tension and nip control by providing the winding parent roll with two nip points—the first nip formed between the winding roll and the second between the winding roll and a second support drum. Preferably the drum encircled by the endless belt lies above the second support drum and the first and second nip points lie in the same vertical plane.

11 Claims, 2 Drawing Sheets

(51) Int. Cl.
  *B29C 59/04*  (2006.01)
  *B65H 18/14*  (2006.01)
  *B65H 18/26*  (2006.01)
  *B65H 20/06*  (2006.01)
  *B65H 18/10*  (2006.01)
  *B65H 18/16*  (2006.01)

(52) U.S. Cl.
  CPC ........... *B65H 18/145* (2013.01); *B65H 18/16* (2013.01); *B65H 18/26* (2013.01); *B65H 20/06* (2013.01); *B65H 23/198* (2013.01); *B65H 2404/256* (2013.01); *B65H 2404/281* (2013.01); *B65H 2406/3124* (2013.01); *B65H 2515/32* (2013.01); *B65H 2801/84* (2013.01)

(56) References Cited

U.S. PATENT DOCUMENTS

| | | |
|---|---|---|
| 4,087,319 A | 5/1978 | Linkletter |
| 4,444,361 A | 4/1984 | Nuttall |
| 4,855,191 A * | 8/1989 | Arakawa .................. G03C 5/17 428/690 |
| 5,531,396 A | 7/1996 | Kinnunen et al. |
| 5,560,566 A | 10/1996 | Bagnato |
| 5,593,106 A | 1/1997 | Cavanagh |
| 5,631,725 A * | 5/1997 | Harasawa .......... G03G 15/1675 399/312 |
| 5,816,528 A | 10/1998 | Ekstroem et al. |
| 5,845,868 A | 12/1998 | Klerelid et al. |
| 5,901,918 A | 5/1999 | Klerelid et al. |
| 5,971,315 A | 10/1999 | Kojo |
| 6,311,921 B1 | 11/2001 | Moeller et al. |
| 6,805,317 B1 | 10/2004 | Andersson et al. |
| 6,923,400 B2 | 8/2005 | Mausser et al. |
| 7,114,675 B1 | 10/2006 | Kohler |
| 7,169,259 B2 | 1/2007 | Linden |
| 7,597,778 B2 | 10/2009 | Thoroee |
| 7,807,024 B2 | 10/2010 | Clarke et al. |
| 2008/0251628 A1 | 10/2008 | Kemppainen et al. |
| 2008/0283656 A1 | 11/2008 | Gelli |
| 2009/0173819 A1 | 7/2009 | Maddaleni et al. |

* cited by examiner

WEB WINDING DEVICE

BACKGROUND OF THE DISCLOSURE

In the manufacture of various types of tissue products such as facial tissue, bath tissue, paper towels and the like, the dried tissue web or tissue sheet coming off of the tissue machine is initially wound into a parent roll and temporarily stored for further processing. Sometime thereafter, the parent roll is unwound and the tissue web is converted into a final product form.

In winding the tissue web into a large parent roll, it is vital that the roll be wound in a manner which prevents major defects in the roll and which permits efficient conversion of the roll into the final product, whether it be boxes of facial tissue sheets, rolls of bath tissue, rolls of embossed paper towels, and the like. Ideally, the parent roll has an essentially cylindrical form, with a smooth cylindrical major surface and two smooth, flat, and parallel end surfaces. The cylindrical major surface and the end surfaces should be free of ripples, bumps, waviness, eccentricity, and wrinkles, i.e. the roll should be substantially uniform. Likewise, the parent roll must be stable, so that it does not depart from its cylindrical shape during storage or routine handling, i.e. the roll should be dimensionally stable. Defects can force entire parent rolls to be scrapped if they are rendered unsuitable for high speed conversion.

A variety of reels have been developed for the winding of paper webs into parent rolls including a reel having an endless flexible belt, such as the reel disclosed in U.S. Pat. No. 5,901,918. In particular, tissue webs having a bulk of about 10 cubic centimeters per gram (cc/g) or higher and a high level of softness, as characterized, for example, by a machine direction slope of about 10 kilograms or less per 3 inches (kg/3") of sample width are especially suited to winding on such reels. Such reels and winding methods can be used to produce substantially uniform and dimensionally stable parent rolls of such soft tissue webs having diameters on the order of 70 to 150 inches.

While belted reels, such as those disclosed in U.S. Pat. No. 5,901,918, are effective at winding soft, high bulk tissue webs, as the machine speed of the belted reel is increased, web handling can become a problem. In particular, the tissue web can wander or be loosely affixed to the transfer belt, causing an uneven parent roll during winding and/or problems in effecting an efficient transfer to a new reel spool during a transfer when the tissue web is changed from winding onto the full diameter parent roll and directed to winding on a new reel spool. One method of solving this problem is to use vacuum boxes beneath the transfer belt to securely hold the tissue web to the transfer belt, as disclosed in U.S. Pat. No. 6,698,681. However, such a solution requires an air permeable transfer belt, which may not always be desirable. Additionally, vacuum boxes are prone to becoming plugged with excess tissue dust and can be a fire or explosion hazard. The exhaust must be sent to a dust removal system, which adds more cost and complexity. Vacuum boxes and dust removal systems require frequent cleanings to ensure safe, reliable operation. Vacuum boxes are only effective to control the tissue web in the immediate area where they are located, and it is difficult to locate them along the entire length of the transfer belt in the reel section. Finally, transfer belt wear can be an issue if tissue dust builds up between the vacuum box and the fabric.

Therefore, there is still a need for an apparatus and method of winding paper webs, especially bulky tissue webs, at faster production speeds having improved web stability in order to wind more uniform parent rolls. There is also still a need for an apparatus and method for maintaining especially good tissue web control during a transfer to manufacture such webs cost effectively.

SUMMARY OF THE DISCLOSURE

The present invention provides an improved belted reel which is particularly well suited for the winding of soft, bulky tissue webs and overcomes the limitations of the prior art. The present invention provides a belted reel which is capable of providing coordinated web tension and nip control by providing the winding parent roll with two nip points—the first nip formed between the winding roll and the second between the winding roll and a second support drum. Preferably the drum encircled by the endless belt lies above the second support drum and the first and second nip points lie in the same vertical plane.

As the winding proceeds, the reel is urged against the belt and the surface of the second support drum to create a first and a second winding nip. The initial nip pressure is preferably kept at a minimal level, such as less than about 1.0 pounds per lineal inch (pli). One advantage of the present winding apparatus is that pressure applied by the reel may be distributed across a pair of nips to lessen the pressure exerted on the web as it passes through the nips during winding. As winding begins the surface speed of the belt and the surface speed of the reel are controlled such that they are substantially the same, while the surface speed of the second support drum is operated at a greater speed. By operating the second support drum at a higher surface speed relative to the reel and the belt, strain may be imparted to the web as it passes from the first to the second nip. By imparting strain to the sheet the wound on tension may be controlled so as to provide the initial windings with relatively high tension and to prevent slippage of the web windings as the roll increases in diameter.

As the roll is wound the pressure of the first and second nips is preferably held constant and at a relatively minimal level, such as less than about 1.0 pli. Further, the surface speed of the belt and the reel continue to be substantially similar and more or less constant. The surface speed of the second support drum however, may be reduced such that sheet strain is reduced and the wound on tension is lower compared to the initial stage of winding. Throughout the winding process the wound tissue roll is contacted at two points and the sheet strain is controlled by varying the surface speed of the second support drum.

Accordingly, it is an object of this invention to provide a winder wherein the wound roll is continuously supported by a belt encircling a first support drum and the surface of a second support drum from the time the web is initially wrapped onto a new reel to the completion of the wound roll.

Another object of this invention is to provide a winder wherein the surface speed differential between the second support drum and the belt is varied through successive stages of the winding process where the drum initially has a higher surface speed which is continuously reduced as the wound roll approaches its completed diameter.

Another object of the invention is to provide a belted winder comprising a reel, a first support drum encircled by an endless belt disposed above a second support drum wherein the support drums remain fixedly mounted during the entire winding process and the belt forms a first nip with the reel and the second support drum forms a second nip with the reel whereby the velocity of the web at the second nip may be varied to control the wound on tension of the web.

Still another object is to provide a two-drum belt winder wherein the maximum nip pressure on the wound roll is maintained below a predetermined value and is maintained at a relatively constant level throughout the winding process.

These, and other objects, features and advantages of this invention will become readily apparent to those skilled in the art upon reading the description of the preferred embodiment in conjunction with the attached drawings.

DETAILED DESCRIPTION OF THE DISLOSURE

Figure 1:
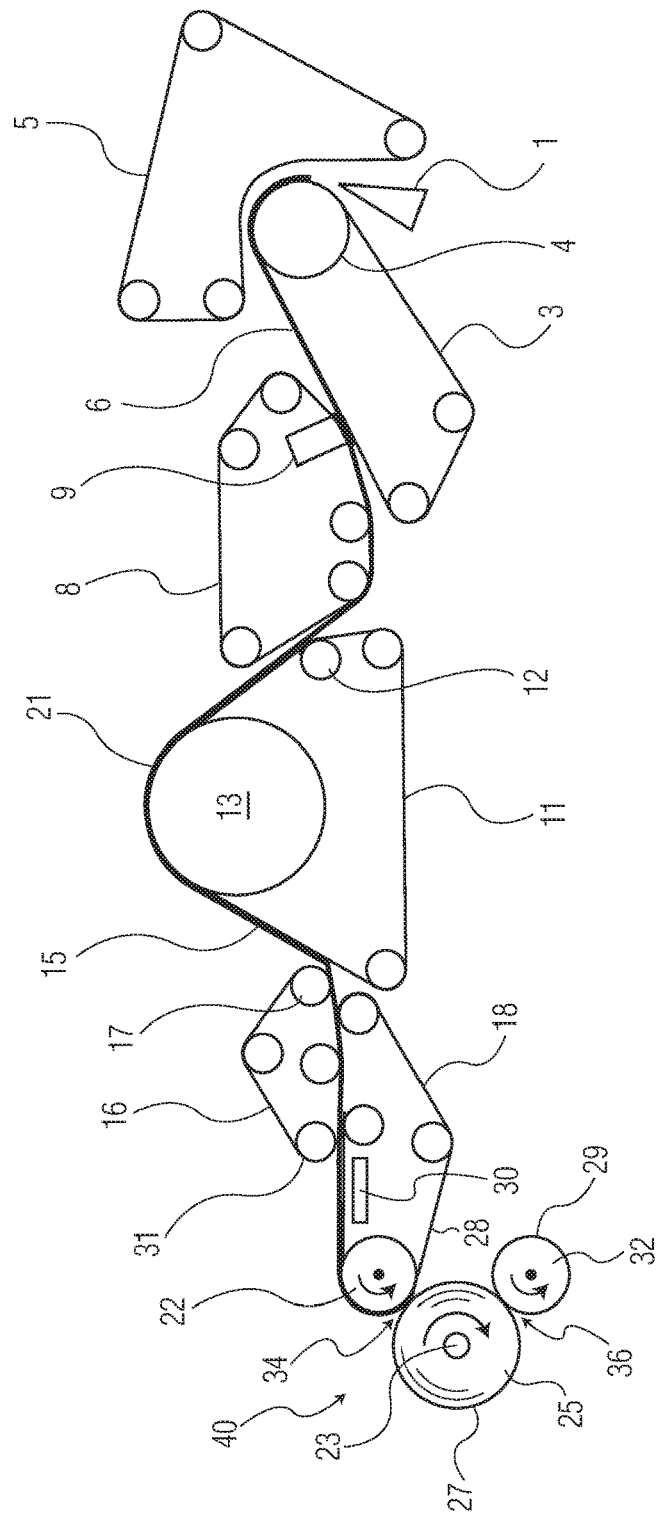
FIG. 1 illustrates an apparatus for manufacturing a parent roll comprising an uncreped through-air dried tissue web according to one embodiment to the present invention.

Referring first to FIG. 1, an apparatus useful for the manufacturing and winding of an uncreped through-air dried tissue web is illustrated. While the illustrated embodiment shows the manufacture of an uncreped through-air dried tissue, the invention is not so limited and the instant web winding apparatus may be adapted to the winding of a wide variety of tissue webs. Rather than being limited to any particular type of tissue web, the present invention is generally directed to an apparatus for transferring the dried tissue web from a papermaking fabric 11, such as a through-air drying fabric, to the first support drum 22 without an open draw. Further the winding apparatus 40 comprises first support drum 22 encircled by a looped belt 18 and a second support drum 32, where the second support drum 32 is disposed below the first drum 22 and reel spool 23. The arrangement of support drums 22, 32 and reel spool 23 in this manner allows for improved sheet strain control and improved parent roll 25 structure, such as improved firmness and fewer web wrinkles.

With continued reference to FIG. 1, which illustrates an exemplary process for manufacturing a parent roll 25 of tissue, the headbox 1 deposits an aqueous suspension of papermaking fibers onto inner forming fabric 3 as it traverses the forming roll 4. Outer forming fabric 5 serves to contain the web 21 until it passes over the forming roll 4 and sheds some of the water. The wet web 6 is then transferred from the inner forming fabric to a wet end transfer fabric 8 with the aid of a vacuum transfer shoe 9. This transfer is preferably carried out with the transfer fabric travelling at a slower speed than the forming fabric (rush transfer) to impart stretch into the final tissue sheet. The wet web is then transferred to the through-air drying fabric 11 with the assistance of a vacuum transfer roll 12. The through-air drying fabric 11 carries the web 21 over the through-air dryer 13, which blows hot air through the web 21 and the supporting through-air drying fabric 11 to dry it while preserving bulk. There can be more than one through-air dryer in series (not shown), depending on the speed and the dryer capacity.

As the dried web 21 leaves the through-air dryer fabric 11, it is transferred to a first dry end transfer fabric 16 with the aid of a vacuum transfer roll 17. The web 21 is then disposed between the first dry end transfer fabric 16 and a second dry end transfer fabric (also referred to herein simply as a belt) 18, which has a greater air permeability than that of the first dry end transfer fabric 16 and which wraps around the first support drum 22. Because of the air flow through the lower fabric caused by roll 31, the sheet transfers to the second dry end transfer fabric 18. It is retained on the top surface of the second dry end transfer fabric by air pressure generated by the presence of an air foil 30 on the underside of the fabric. The tissue web 21 is then carried to a first winding nip 34 formed between the reel spool 23 and the outer surface 28 of the belt 18. The web 21 continues on the reel spool 23 to a second nip 36 created between the outer surface 29 of a second support drum 32 and the reel spool 23. As the web 21 is wound into a roll 25 the first and second nips 34, 36 are formed between the outer surface 27 of the wound roll 25 and the outer surface 28 of the belt 18 and the outer surface 29 of the second support drum 32 respectively.

Figure 2:
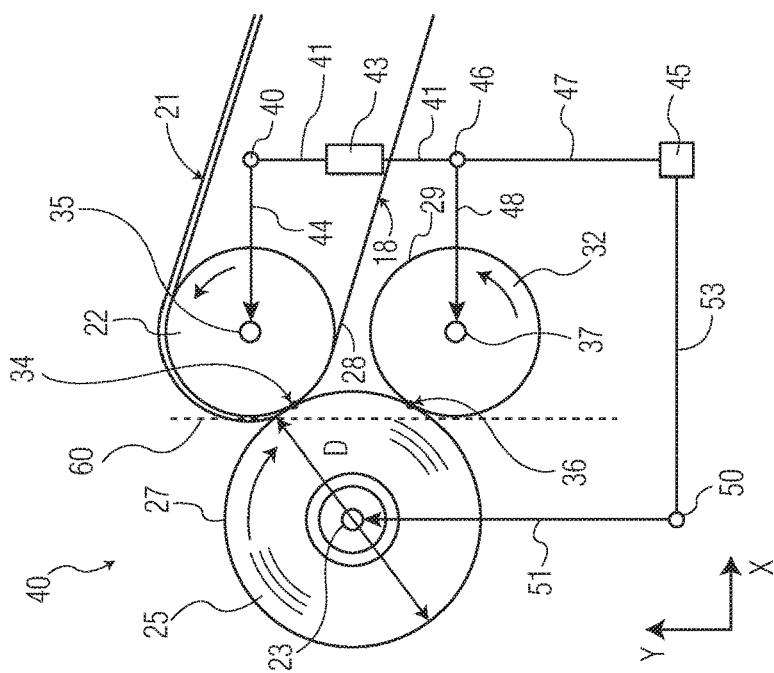
FIG. 2 is a detailed view of an apparatus according to one embodiment of the present invention useful for winding a tissue web.

Turning now to FIG. 2, a detailed view of the winding apparatus 40 is provided. The first and second support drums 22, 32 are rotatably mounted in framework (not shown) in a winder for winding an on-coming tissue web 21 from a tissue machine. The structure of the winder, such as beams, bearing housings and apparatus for rotatably linking the support drums with drive motors, are well-known in the tissue making industry and, therefore, have not been shown here to facilitate the depiction and understanding of the inventive concept. Each support drum 22, 32 also has a center shaft 35, 37 and a drum body which rotate about their longitudinal axes, respectively.

A continuous, looped belt 18 has been looped over the fixedly mounted first support drum 22 to define its outer peripheral surface 28, such that surface 27 of the reel spool 23 faces the outer surface 28 of the looped belt. The tension of the continuous, looped belt 18 may be controlled by a belt tensioning roll (not illustrated) disposed within the looped belt. A new reel spool 23, also referred to simply as a reel or a core, is inserted between the facing peripheral surfaces 28, 29 of a pair of spaced, vertically disposed support drums 22, 32.

The belt 18 passes over a first support drum 22 to define a winding region that includes the first nip 34 formed between the belt 18 and the wound up roll 25. The portion of the belt prior to the winding region upstream of first support roll defines a web transport region where the tissue web is conveyed on the transfer belt to the winding region. The belt then returns to pick up the tissue web again by use of one or more support or guide rolls as known to those of skill in the art. The tissue sheet is transferred to a parent roll 25 within the winding region. The parent roll 25 is wound on a reel spool 23, which is driven by a drive motor 50 acting on the shaft of the reel spool.

The first and second support drums are preferably driven, for example by drive motor acting on the first and second support drum shafts. In a particularly preferred embodiment, such as that illustrated in FIG. 2, drive motors 40, 46 are operatively connected to each of the first and second support drums 22, 32, as illustrated schematically by arrows 44, 48, to rotate the drums in the direction of arrows to wind the on-coming tissue web 21 onto the reel spool 23 and initiate the winding of a wound tissue roll 25. The motors can also be linked electrically 41 via a control device 43 so that each motor 40, 46 can have its speed, and torque, controlled independently of the other motor. Thus, for example, the first motor 40 can be run faster, or provide more torque, than the second motor 46.

Generally the first and second support drums 22, 32 are arranged vertically relative to one another with the first support drum 22 positioned above the second support drum 32. As such the first and second support drums 22, 32 are spaced apart vertically a distance D1 (see FIG. 3). The vertical spacing (D1), which is generally measured between the respective axes of rotation of center shafts 35, 37 of the first and second support drums 22, 32, may vary depending on the size of drums, the size of roll to be built and the desired vertical spacing between the first and second nip points.

While the first and second support drums are arranged vertically relative to one another, the outer peripheral surface preferably lies in the same vertical plane. For example, with continued reference to FIG. 2, the outer peripheral surface 28 of the first support drum 22, which is formed by the outer surface of the belt 18 looped around the first support drum 22, and the outer facing surface 29 of the second support drum 32 lie in the same vertical plane 60. In this manner the axes of rotation of center shafts 35, 37 of the first and second support drums 22, 32 are offset from one another so as to account for the thickness of the belt 18 looping the first support drum 22. The outer surface 28 of the belt 18 and the outer facing surface 29 of the second support drum 32 contact the reel spool 23, or the building roll 25 as the case may be, to form a first nip 34 and a second nip 36. As such the first and second nips 34, 36 generally lie in the same vertical plane 60 and are vertically spaced apart from one another a distance D2.

In other embodiments, the outer surfaces of the belt and the second support drum may be arranged in the same vertical plane by sizing the second support drum slightly larger than the first drum to account for the thickness of the belt. In this manner the first and second support drum may have different diameters, but may have axes of rotation which are vertically aligned with one another as well as outer surfaces that lie in the same vertical plane.

The surfaces of the belt and the second support drum advantageously have a coefficient of friction great enough to drive the incipient wound tissue products when the leading edge is introduced into the first and second nips. The appropriate coefficient of friction may be achieved by selecting suitable materials for the belt and the second support drum or by treating the outer surfaces of the same. For example, a variety of surface finishes may be applied to the belt and/or drum, such as a matte finish with a high friction urethane or an elastomeric rubber covering. The entire outer surface of the belt or the second support drum may be covered with a suitable material or circumferential bands of the friction material may be applied to achieve the advantageous friction surfaces. In certain embodiments the outer surfaces of the belt and the second support drum may be provided with different degrees of friction by treating the surfaces differently.

Figure 3:
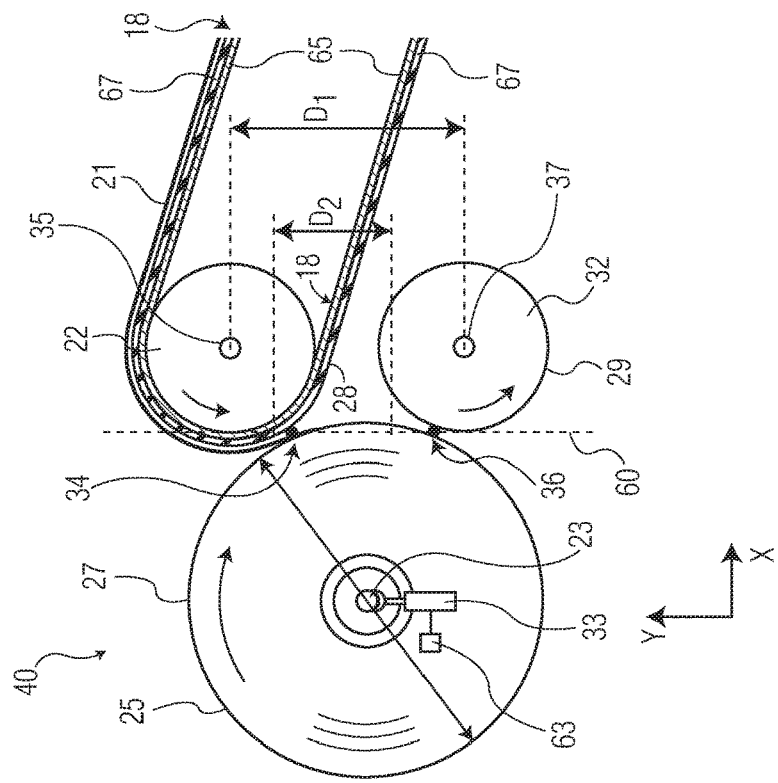
FIG. 3 is a detailed view of an apparatus according to one embodiment of the present invention useful for winding a tissue web.

In one particularly preferred embodiment, such as illustrated in FIG. 3, the belt 18 is made with an inelastic base ply 65 with an outer ply 67, at least on the side facing the wound tissue roll 25, comprised of an elastic, deformable material, such as rubber (incompressible) or microporous elastomer (compressible). The belt can be of a continuous design or have a non-marking splice to facilitate the installation of a new belt having a finite length over the faces of a drum without having to cantilever the drums and mount a looped belt over the unsupported ends of the support drums.

In other embodiments the belt is air permeable, such as a belt having an air permeability greater than about 50 cubic feet per minute per square foot of fabric (cfm/ft$^2$). More specifically, the belt can have an air permeability from about 100 to about 300 cfm/ft$^2$, and still more specifically from about 125 to about 175 cfm/ft$^2$. Air permeability, which is the air flow through a fabric while maintaining a differential air pressure of 0.5 inches of water across the fabric, is tested in accordance with ASTM test method D737-96. The air permeability of the belt may be less than that of the first dry end transfer fabric, causing the web to naturally adhere to the belt. In addition, the belt may be smoother than the first dry end transfer fabric in order to enhance transfer of the web.

In certain embodiments the surface of the second support drum may be treated to provide the surface with an increased coefficient of friction. Such treatments may include tractionizing to increase the coefficient of friction to improve the differential torque transmission to the winding roll. Tractionizing may include spray application of a metal such as tungsten carbide or molybdenum to the surface of the drum.

In other embodiments a pattern may be applied to the surface of the second support drum to increase the coefficient of friction, such as applying a plurality of grooves. In addition to altering the frictional properties of the drum, the application of a plurality of narrow grooves may aid in eliminating the surface air that travels with the web from becoming entrained in the winding roll of paper. Eliminating the entrained air stabilizes the layer to layer slippage within the roll during winding.

In still other embodiments the second support drum may comprise an elastomeric cover to alter the friction properties of the drum surface and improve winding performance. Elastomeric covers which are softer than the wound paper roll may be selected so that the cover is deformed at the second nip point when contacted by the wound roll. The deflection of the nip point into the elastomeric cover may lessen the interlayer shear stress between layers of the wound tissue web and reduce the relative layer-to-layer motion. While a wide range of elastomeric covers may be suitable, it is generally preferred that the elastomeric cover be selected so as to minimize the extent of deformation and material degradation as a result of heating during the winding process.

Reel spools useful for winding parent rolls are well known in the art and will not be discussed in detail here. The reel spool 23 is generally operatively connected 51 to a drive motor 50 to rotate the reel spool 23 in the direction of arrow and provide the reel drum with a surface speed. The drive motor 50 may be linked electrically 53 to the first and second support drum motors 40, 46 via a control device 45 so that each motor 40, 46, 50 can have its speed, and torque, controlled independently of the other motors. Thus, for example, the reel motor 50 and first support drum motor 40 may be coupled to one another, with the support drum motor 40 in speed control operated as the master and the reel motor 50 operated in torque control as the slave, which receives its torque set point from the master.

The relative position of the reel spool 23 along the support carriage (not illustrated) and in-turn the nip load of the first and second nips 34, 36 may be controlled by hydraulic actuators 33 which position the carriages on which the bearing housings and thus the paper reel are supported. Nip pressure may be monitored by monitoring the pressure via a pressure sensor 63 in the hydraulic actuators 33 which position the carriages. Alternatively, load cells have been incorporated in the pins which join the hydraulic cylinders to the carriages. When the reel is urged against the belt and the second support drum by the operation of the hydraulic actuators a force is applied at the first and second nips.

To prevent loss of web bulk during the winding process the amount of pressure applied by the hydraulic actuators to the reel spool and the resulting first and second nip pressures are maintained at relatively low levels. Preferably the nip pressure is less than about 2.0 pli, more preferably less than about 1.0 pli and still more preferably less than about 0.75 pli. In a particularly preferred embodiment the nip pressure is maintained constant throughout the winding process by controlling the position of the reel along the carriage in the x-axis and/or by adjusting the pressure applied to the reel by the hydraulic cylinders.

In addition to varying the nip pressure by controlling the relative position of the spool, wound roll properties may be controlled by controlling one or more of the motors 40, 46, 50 to vary the relative surface speeds of the reel spool 23, belt 18, and second support drum. For example, in certain embodiments the motors are operated such that the surface speeds of the reel and the belt are substantially similar, while the surface speed of the second support drum is greater, such as at least about 2 percent greater, more preferably 5 percent greater and in certain instances 10 percent greater. The surface speed of the second support drum may be varied relative to the surface speeds of the belt and reel to control wound on tension and control roll build and structure as needed.

To begin winding of a web 21 the reel spool 23 is rotated in the direction of arrow by a drive motor 50 and urged against a web 21 traveling over the outer surface of a belt 18 looped over a first support drum 22 at a first nip 34. The on-coming web 21 is wrapped over the reel spool 23 to begin the winding of a new wound roll 25 of tissue. At this point, the core and newly started tissue web is supported by the belt and the second support drum such that the web is nipped between the belt and core/wound roll (nip 34) and between the second support drum and core/wound roll (nip 36). Thus, as winding is initiated the core/wound roll is supported by the belt 18 at the first nip 34 and by the second support drum 32 at the second nip 36.

Immediately, or nearly immediately, tension of the web as it is held against the tissue roll being wound is controlled by the pressure applied by the reel against the belt and second support drum at the first and second nips and the speed differential between the reel, belt and second support drums. The initial nip pressure is preferably kept at a minimal level, such as less than about 1.0 pli. One advantage of the present winding apparatus is that pressure applied by the reel may be distributed across a pair of nips to lessen the pressure exerted on the web as it passes through the nips during winding. As winding begins the surface speed of the belt and the surface speed of the reel are controlled such that they are substantially the same, while the surface speed of the second support drum is operated at a greater speed. By operating the second support drum at a higher surface speed relative to the reel and the belt, strain may be imparted to the web as it passes from the first to the second nip. By imparting strain to the sheet the wound on tension may be controlled so as to provide the initial windings with relatively high tension and to prevent slippage of the web windings as the roll increases in diameter.

As the roll is wound and the wound tissue roll increases in diameter, the pressure of the first and second nips is preferably held constant and at a relatively minimal level, such as less than about 1.0 pli. Further, the surface speed of the belt and the reel continue to be substantially similar and more or less constant. The surface speed of the second support drum however, may be reduced such that sheet strain is reduced and the wound on tension is lower compared to the initial stage of winding. Throughout the winding process the wound tissue roll is contacted at two points and the sheet strain is controlled by varying the surface speed of the second support drum.

Finally, as the wound roll approaches a predetermined diameter, and, ultimately, it's maximum desired diameter, the surface speed of the second support drum relative to the reel and belt surface speeds may be increased to apply more strain to the web and increase the wound on tension to complete the winding process.

This coordinated operation of surface speeds of the reel, the belt and the second support drum enables improved control of sheet strain as the web passes from the first to the second nips and in-turn improves wound-in tension control. Thus, the tension variations produced in the parent roll at various stages in the winding operation range from relatively high tension at or near the initial stage of the web winding process when the wound roll has a relatively small diameter, through an intermediate stage when the wound-in tension is decreased, to the stage where the wound roll is at or near its maximum size, when the wound-in tension is increased again. This coordinated operation of the various components produces a desirable wound-in tension throughout the range of operation from when the web is initially brought onto a new core to when the wound roll is finished.

The area of the first and second nip load profiles also gradually increases from a relatively small amount in a smaller span, as shown in FIG. 2, to a relatively larger amount in the relatively larger span shown in FIG. 3. This is possible despite the fixedly mounted support drums 22, 32 due to the coordinated corresponding movement of the wound roll 25 in the x-axis along a carriage. Thus, in certain embodiments it may be desirable to control the nip load profiles of the first and second nips by controlling the position of the reel spool, and in-turn the wound roll, during the course of winding.

The position of the reel spool 23, and in-turn the wound roll 25, may be controlled by a hydraulic cylinder, which moves the reel spool horizontally along the x-axis during the winding process. In addition to controlling the relative position of the reel spool during winding, the hydraulic cylinder may be used to control the nip pressure at the first and second nips by urging the wound roll against the belt and second support drum or moving the reel in the opposite direction to lessen the nip pressure.

Unlike conventional two drum winders, the nip pressure is largely independent of the roll weight. Instead, nip pressure is generally controlled by the position of the reel and any pressure applied to the reel. At some point, the size of the wound roll becomes great enough to provide the desired nip load against the support drums to maintain the desired web tension during the winding process so that no additional nip load is required of the hydraulic cylinder. The load of the cylinder is then relieved to a nominal amount against the wound roll to provide no significant nip load which contributes to the nip load between the wound roll and the belt and second support drum. Wound on tension may thereafter be controlled by varying the relative speed of the belt and the second support drum. Because the total nip pressure on the wound roll does not continue to increase with the diameter of the wound roll, the wound on tension similarly does not increase. The ability to decrease both nip and wound on tension results in fewer roll defects such as crushing, bursting and wrinkling.

In one particular embodiment, the present disclosure is particularly directed to a system that is capable of producing products having any desired roll bulk within a relatively large roll bulk range. The roll bulk of the resulting product, for instance, can be controlled by controlling at least one of the nip pressure, the incoming tension of the tissue web and/or the torque of the mandrel as described above. In one embodiment, for instance, only a single one of the above process conditions can be controlled to vary roll bulk, such as the nip pressure. In another embodiment, at least two of the above process conditions can be controlled to produce products. In still another embodiment, all three of the above process conditions can be controlled together to produce a product having a desired roll bulk. For example, softer rolls having relatively high roll bulk levels can be created by decreasing the torque of the mandrel, decreasing the nip pressure between the mandrel and the transport conveyor and/or decreasing incoming tension, which may be the tension between the mandrel and a tension device upstream, such as a vacuum roll. Conversely, more firm rolls having less roll bulk can be made by increasing the torque of the mandrel, increasing nip pressure, and/or increasing incoming tension.

The system of the present disclosure, for instance, is capable of producing rolled products having a roll bulk anywhere from about 10 to about 30 cc/g, such as from about 12 to about 25 cc/g. Conventional rewinders, such as surface driven winders or center driven winders, on the other hand, simply are not capable of producing products within such a broad range of roll bulks efficiently or at consistently high production speeds.

Of particular advantage, products can be made within the entire roll bulk range described above without having to substantially reduce the speed of the system. In particular, products having any desired roll bulk can be produced while the tissue web is traveling at a speed of greater than about 1,500 feet/minute, such as greater than about 1,800 feet/minute, such as greater than 2,000 feet/minute. In one embodiment, for instance, the products can be produced while the tissue web is moving at a speed greater than about 2,000 feet/minute and still more preferably greater than about 3,000 feet/minute, such as from about 2,000 to about 6,000 feet/minute.

While the instant web winding apparatus has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto and the foregoing embodiments.

In a first embodiment the present invention provides an apparatus for winding a web into a roll comprising: a rotatably mounted reel spool having a first rotational axis; an endless belt encircling a rotatably mounted first support drum for rotation along a predetermined path of travel having a winding region and a web transport region, and the winding region is positioned adjacent to the reel spool and creates a first nip region, the first support drum having a second rotational axis positioned above the first rotational axis; a rotatably mounted second support drum having a third rotational axis positioned below the first and second rational axes, the second support drum further positioned adjacent to the reel spool to create a second nip region.

In a second embodiment the present invention provides the winding apparatus of the first embodiment wherein the endless belt is air permeable and has an air permeability greater than about 50 cfm/ft$^2$.

In a third embodiment the present invention provides the winding apparatus of the first or the second embodiments further comprising an actuator for positioning the reel spool and the endless belt relative to one another.

In a fourth embodiment the present invention provides the winding apparatus of any one of the first through the third embodiments further comprising a sensor measuring the pressure of the first nip and a controller connected to the sensor providing a means for controlling the pressure of the first nip as the roll increases in diameter.

In a fifth embodiment the present invention provides the winding apparatus of any one of the first through the fourth embodiments further comprising a drive motor operably connected to the reel spool for rotating the reel spool, a drive motor operably connected to the first support drum for rotating the first support drum, and a drive motor operably connected to the second support drum for rotating the second support drum.

In a sixth embodiment the present invention provides the winding apparatus of any one of the first through the fifth embodiments wherein the first and the second nip regions are vertically aligned with one another and lie in substantially the same vertical plane.

In a seventh embodiment the present invention provides a method of winding a web to form a roll comprising the steps of: engaging an endless belt encircling a rotatably mounted first support drum against a reel spool creating a first nip; engaging a rotatably mounted second support drum against the reel spool creating a second nip; rotating the reel spool; rotating the endless belt; rotating the second support drum; advancing the web into the first nip and second nips and directing the web around the reel spool to form a roll of increasing diameter; matching the surface speed of the reel spool and the belt and varying the surface speed of the second support drum relative to the surface speed of the reel spool and the belt.

What is claimed is:

1. An apparatus for winding a web into a roll comprising:
 a rotatably mounted reel spool having a first rotational axis;
 an endless belt encircling a rotatably mounted first support drum for rotation along a predetermined path of travel having a winding region and a web transport region, and the winding region is positioned adjacent to the reel spool and creates a first nip region lying in a first vertical plane, the first support drum having a second rotational axis positioned above the first rotational axis;
 a rotatably mounted second support drum having a third rotational axis positioned below the first and second rational axis, the second support drum further positioned adjacent to the reel spool to create a second nip region lying in a second vertical plane,
 wherein the first and the second nip regions are vertically spaced apart from one another and the first and second vertical planes lie in substantially the same vertical plane.

2. The apparatus of claim 1 wherein the endless belt is air permeable and has an air permeability greater than about 50 cubic feet per minute per square foot of fabric (cfm/ft$^2$).

3. The apparatus of claim 1 further comprising an actuator for positioning the reel spool and the endless belt relative to one another.

4. The apparatus of claim 3 further comprising a pressure sensor for measuring the pressure of the first nip and a controller operatively connected to the pressure sensor and the actuator for controlling the pressure of the first nip.

5. The apparatus of claim 1 further comprising a drive motor operably connected to the reel spool for rotating the reel spool, a drive motor operably connected to the first support drum for rotating the first support drum, and a drive motor operably connected to the second support drum for rotating the second support drum.

6. The apparatus of claim 5 wherein each drive motor is operatively connected to a control device for controlling the speed or torque of the motor.

7. The apparatus of claim 1 wherein the first and second support drums are arranged vertically relative to one another with the first support drum positioned above the second support drum.

8. The apparatus of claim 1 wherein the endless belt encircling a rotatably mounted first support drum defines a first outer peripheral surface and the surface of the second support drum defines a second outer peripheral surface, wherein the first and second outer peripheral surfaces lie in the same vertical plane.

9. The apparatus of claim 1 wherein the first support drum has a first diameter and the second support drum has a second diameter, wherein the first and second diameters are different.

10. The apparatus of claim 1 wherein the second support drum comprises an outer cover consisting of urethane or an elastomeric rubber.

11. The apparatus of claim 1 wherein the belt comprises a first ply and a second outer ply, wherein the second ply consists of rubber or a microporous elastomer.

* * * * *